(No Model.)
D. FRISBIE.
FRICTION CLUTCH.
No. 265,953. Patented Oct. 17, 1882.
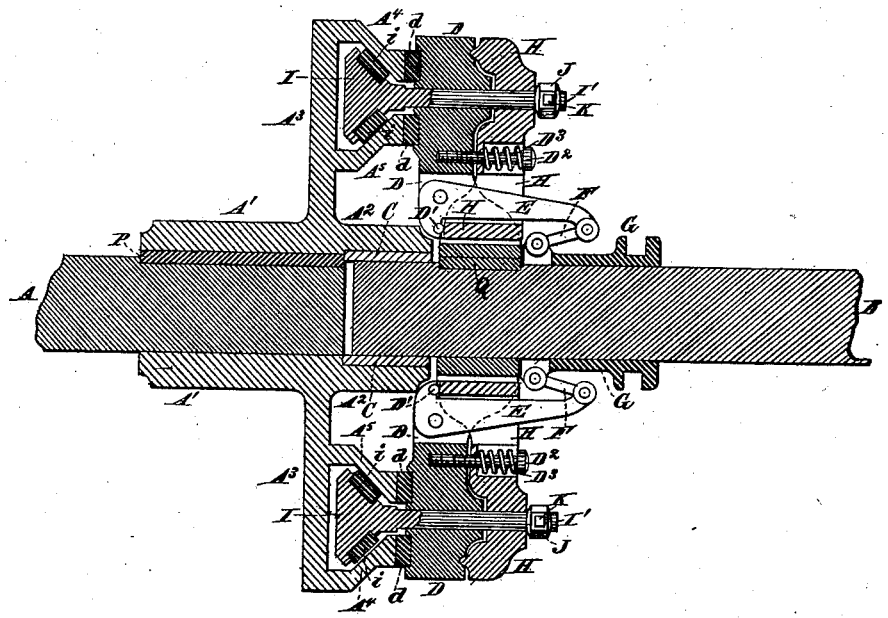
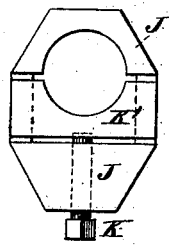
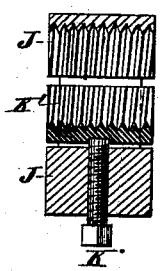
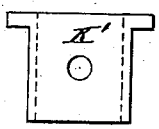
Witnesses
Charles R. Searle.
B. E. D. Stafford
Inventor
Dennis Frisbie
by his Attorney
Thomas D. Stetson

UNITED STATES PATENT OFFICE.

DENNIS FRISBIE, OF NEW HAVEN, CONNECTICUT.

FRICTION-CLUTCH.

SPECIFICATION forming part of Letters Patent No. 265,953, dated October 17, 1882.

Application filed July 25, 1881. (No model.)

*To all whom it may concern:*

Be it known that I, DENNIS FRISBIE, of New Haven, in the county of New Haven and State of Connecticut, have invented certain new and useful Improvements relating to Friction-Clutches, of which the following is a specification.

My improved clutch is based on the invention set forth in the Patent to A. B. Bean, March 3, 1874, No. 148,165.

The present invention consists in improvements in the details.

I have dispensed with the cone as a means of communicating force to put on the clutch and have substituted links. The sleeve is moved away from the clutch to engage it, and the links work at a fair advantage in all positions. I provide for adjusting the bearing nicely while holding the parts very strongly, so that the clamping force will be amply sufficient when the toggle force is in its most efficient action. I provide more than ordinarily delicate means of adjustment. Stout nuts are held by friction-screws through threaded shoes which exert a force against the threads of the bolts, with means to receive the force of the screws without possible injury to the threads. I arrange the friction-surfaces at an incline. I make the frictional surfaces of wood. When the clutch is applied to connect two lengths of shafting I hold them efficiently in line at the center with a provision, by means of a removable bushing, for allowing for wear.

The accompanying drawings form a part of this specification, and represent what I consider the best means of carrying out the invention.

Figure 1 is a central section through my improved clutch as applied to connect and disconnect two lengths of shafting. Figs. 2, 3, and 4 represent details on a larger scale. Fig. 2 is a longitudinal section; Fig. 3, an end view and Fig. 4 an elevation of a portion.

The drawings represent the novel parts, with so much of the ordinary parts as is necessary to indicate their relations thereto.

Similar letters of reference indicate like parts in all the figures.

A and B are adjacent ends of two separate lengths of shafting, which it is the object of my invention to connect firmly together or to disconnect, and to rotate the one independently of the other, as may be desired, from time to time.

$A'$ $A^2$ is a stout hub or boss, secured on the part A by a feather, P. The part $A^2$ extends out beyond the end of the shaft A and loosely incloses the adjacent end of the shaft B.

C is a removable bushing, which fills the space between the shaft B and the inner surface of $A^2$, so as to hold the shafts reliably in line.

$A^3$ is a stout and wide flange, extending out from the hub $A'$ and forming a wheel.

$A^4$ and $A^5$ are broad and peculiarly-formed flanges on the face which is presented toward the other shaft, B. The annular space between is of dovetailed section. The inner faces of these lips are smoothly finished at an incline of about forty-five degrees. The edges of these flanges are broad, and are finished plane.

D is a stout wheel, rigidly secured on the shaft B by a key, Q.

E E are bell-crank levers mounted in radial slots provided in the wheel D at the points represented. The arms of the levers E are unequal. The long arm of each extends along approximately parallel to the shaft B. To the outer end of each lever E is knuckled a link, F, the other end of which is knuckled to a sleeve, G, which is traversed longitudinally on the shaft B by means of a lever (not shown) engaging in the groove in the manner commonly practiced in operating friction-clutches. There may be two, four, or various other numbers of these levers E and links F, all connected to the same sleeve G and operated thereby. I have shown two. A description of one will suffice for both or all. The short arm of each of the levers E extends radially inward, and engages, through the intervention of an anti-friction roller, $D'$, with the inner end of a stout lever, H. The lever H is mortised to allow the lever E to traverse loosely through it and to vibrate to the proper extent therein. As the sleeve G is moved and the levers E are turned by the links F the stout short arm of the lever E acts on the lever H and turns it slightly on its stout axis or knife-edge, which is near the periphery of the wheel D. One or more guide-pins, $D^2$, fixed in the wheel D, are equipped with spiral springs D³, which find their abutments under the heads of the bolts or pins D² and hold the lever H in their bearings and take up all the slack or lost motion of the parts.

I I are V-shaped friction-pieces, fitted in the dovetailed space between the lips or flanges A⁴ A⁵. A smoothly-finished bolt, I', leads from each through a close fitting hole in the wheel D and through a loose-fitting hole in the lever H. Its outer end is equipped with a peculiarly-formed nut, which engages it with the lever H. The nut J is adjusted in the ordinary manner by turning more or less in one direction or the other. When the desired point is found it is set firmly in position on the bolt by turning a pinching-screw, K, the point of which enters a little into a long shoe, K', threaded to match the threads in the bolt and fitted in a recess in the nut, as indicated. To adjust the grip, the screw K should be slackened and the nut J turned to the required extent, and then the screw K tightened again. Blocks of lignum-vitæ or other suitable wood, i, are fitted in the working-faces of the V-shaped bearing-pieces I, so as to make the working friction against the beveled inner faces of the flanges A⁴ A⁵. Blocks of similar or different wood, d, are correspondingly fitted in recesses in the wheel D, so as to make the working friction against the plane edges of A⁴ A⁵. The wood is preferably mounted with the end of the grain presented to receive the wear, and it is well to saturate it with oil before the device is put to work. It will be observed that the shoe K' in the nut J is formed with a broad flange, which finds a fair bearing on the outer face of the main body of the nut. The strong pull of the bolt I, communicated through the threads on the shoe K', is transmitted to the main body of the nut by the aid of this flange. The construction is strong and reliable.

Modifications may be made in many of the details.

Some parts of the invention may be used without the others.

I propose to employ a considerable number of the guide-pins D². Each may have a head and a spring, D³; or these adjuncts may be employed on only one in the position represented. In such case the other guide-pins would serve the single function of holding the lever H in position and allowing it to have the slight motion required. When equipped with the spring D³ they perform the further function of aiding to take up the lost motion.

The boss on the wheel D around each bolt I' may be increased, always taking care to provide a corresponding and somewhat deeper recess in the adjacent portion of the lever H; or the boss can be omitted altogether. Its presence simply allows a longer bearing for the bolt I'.

The wood bearings d and i may be omitted and the metal of the friction-piece I and of the wheel D respectively allowed to bear directly against the flanges A⁴ A⁵.

Instead of employing a loose feather, P, a tight-fitting key may be driven there. A feather allows the respective wheel, and also the shafts A and B, to play endwise to a reasonable extent without interfering with or affecting the action of the clutch.

The friction-roller D' may be omitted and the contact formed directly.

Although I have described the invention as applied to connect the two shafts in line, and one feature of it—the socketing of the end of one shaft in the casting—is particularly applicable thereto, it will be understood that the other parts of the invention may be used in friction-clutches in any other situation, among which are cases where a continuous shaft extends through the apparatus and a pulley is loose thereon, except as it is engaged by the friction-clutch. The invention is equally applicable in such cases, and in all cases where the shaft and the levers traverse around continuously, and the pulley with which it engages is sometimes held stationary, or under the reverse conditions, where the levers and their connected shafts are sometimes stationary and the pulley continuously rotating.

The sinking of the end of the screw K a little into the shoe K' is useful in holding the parts J and K together before their application to the bolt, and is generally of advantage; but it may be omitted and the screw allowed to bear simply against a plane surface of the shoe, if desired in any case.

The V shape of the friction-piece I, with the bearing-faces properly equipped with wood, as shown, gives a frictional surface which extends over a greater area and induces a greater pressure on a unit of area with a given pull on the rod I' than the rectangular blocks and parallel bearing-surfaces heretofore employed. This form also centers the work truly at each operation. Care being taken to manufacture the parts accurately, with the flanges A⁴ A⁵ exactly concentric to the shaft A and bushing C, any tendency of one part to get out of line with the other is corrected when the strain is applied to effect the clutching.

Some of the advantages due to certain features of the invention may be enumerated as follows:

First, by reason of the V shape of the friction-pieces I and of the groove in which they work, I am able to obtain a greater frictional surface and a greater force on the surface, and also to aid in centering the parts by the application of the clutch.

Second, by reason of the long hub A' A² and bushing C, I obtain a centering independent of and additional to that formed by the frictional surfaces, which is important in connecting lengths of shafting.

Third, by reason of the compound lever H E, worked by the toggle-links F and sleeve G, I obtain an extraordinary multiplication of force in inducing pressure.

Fourth, by reason of the bolt I' and adjusting-nut J thereon, I add to the last-named combination facilities for adjusting with great nicety as the friction surfaces become compressed or worn away.

Fifth, by reason of the pinching-screw K and threaded shoe K' in the nut J, and serving on the bolt I' to operate the friction-piece I by the lever H and its connections, I secure unusual facility and nicety of adjustment.

I claim as my invention—

1. In a friction-clutch, an annular channel of dovetailed or reversed-V-shaped section, in combination with corresponding reversed-V-shaped friction-pieces traversed therein and attached to the other part, and with abutting surfaces or pieces to allow of inducing the friction by pressing the reversed-V-shaped and abutting pieces together, as herein specified.

2. The two independent lengths of shafting, A B, a long hub, A' A², and bushing C, in combination with each other and with the wheels A³ D, mounted on the respective shafts, and friction-pieces I, and means for operating them, arranged to serve as a friction-clutch, with the shafts held in line at the center, as herein specified.

3. In a friction-clutch, the friction-pieces I, carried on one wheel and engaging frictionally with the other, in combination with the compound lever H E, toggle-links F, and operating-sleeve G, as herein specified.

4. The bolt I' and adjusting-nut J thereon, in combination with the friction-piece I, and with the compound lever H E, toggle-links F, and sleeve G to allow of adjustment to accommodate the toggle action, as herein specified.

5. The pinching-screw K and threaded shoe K', in combination with each other and with the nut J, bolt I', friction-piece I, and with the lever H and its operating means, as herein specified.

In testimony whereof I have hereunto set my hand, at New York city, this 20th day of July, 1881, in the presence of two subscribing witnesses.

DENNIS FRISBIE.

Witnesses:
M. F. BOYLE,
H. A. JOHNSTONE.